Figure 5:
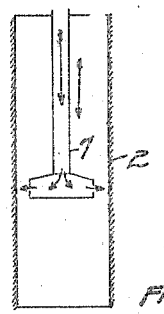

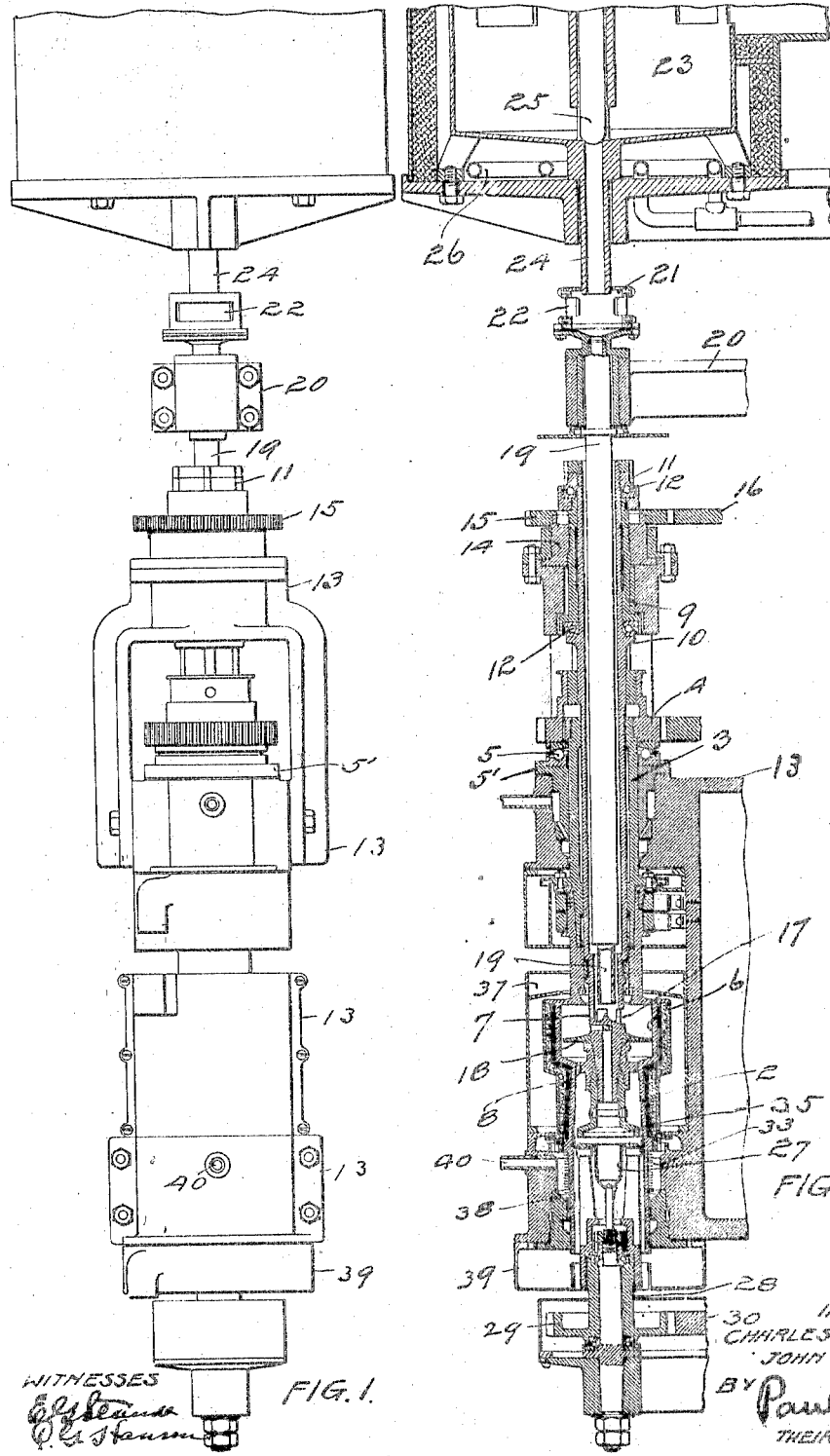

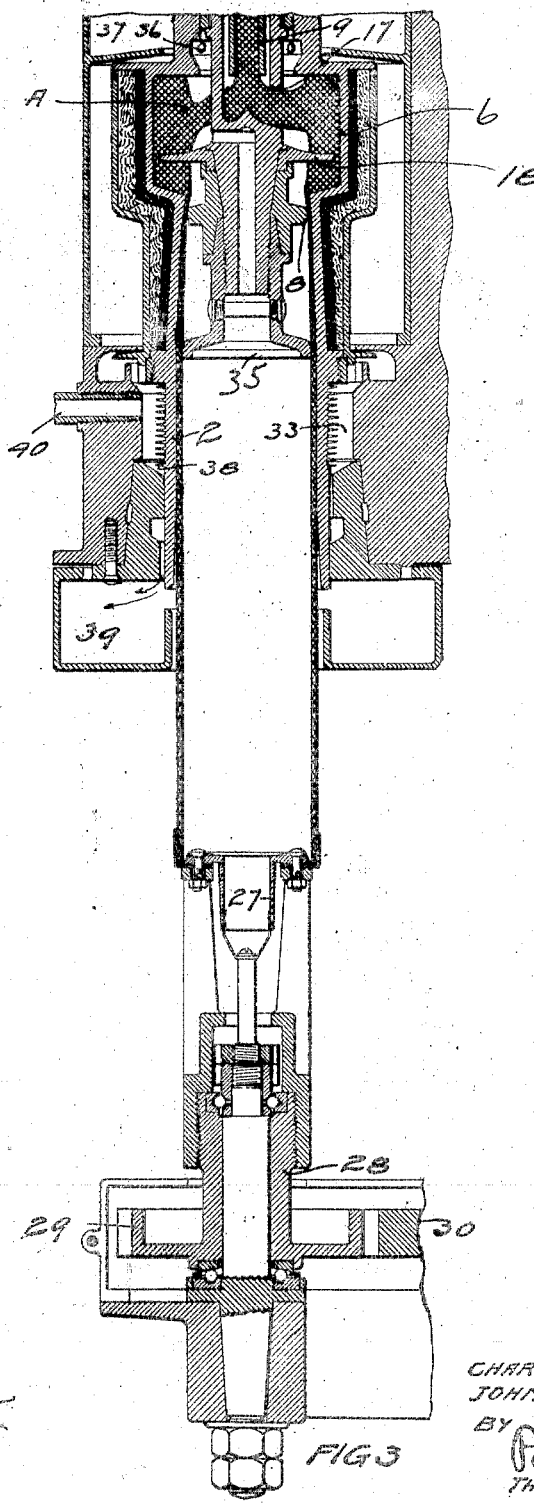

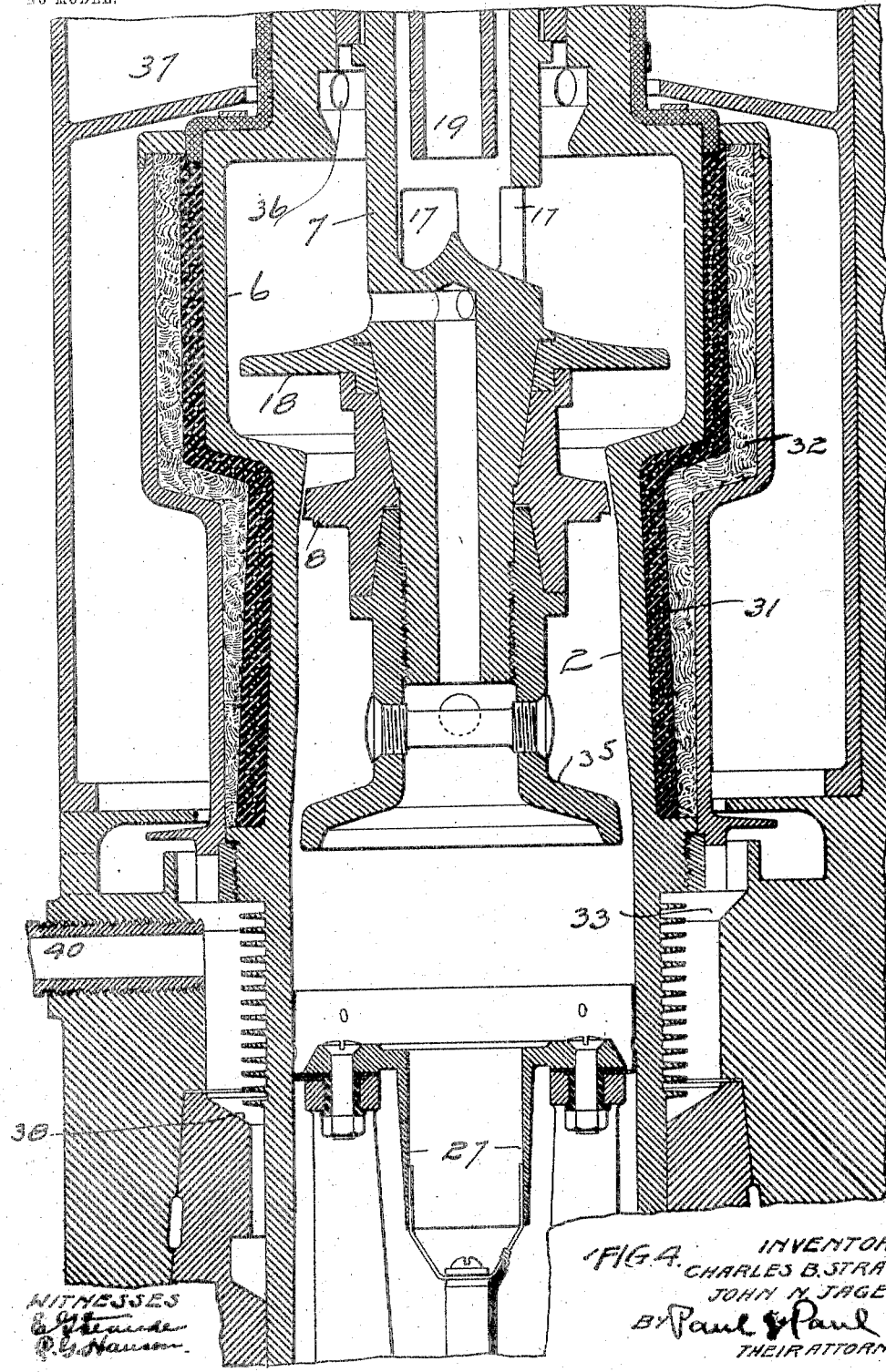

No. 777,559. PATENTED DEC. 13, 1904.
C. B. STRAVS & J. N. JAGER.
PROCESS OF FORMING PIPE.
APPLICATION FILED JAN. 2, 1904.
NO MODEL. 4 SHEETS—SHEET 4.

WITNESSES

INVENTORS
CHARLES B. STRAVS
JOHN N. JAGER
BY Paul & Paul
THEIR ATTORNEYS

No. 777,559. Patented December 13, 1904.

UNITED STATES PATENT OFFICE.

CHARLES B. STRAVS AND JOHN N. JAGER, OF MINNEAPOLIS, MINNESOTA, ASSIGNORS OF ONE-THIRD TO ANTHONY HUHN, OF MINNEAPOLIS, MINNESOTA.

PROCESS OF FORMING PIPE.

SPECIFICATION forming part of Letters Patent No. 777,559, dated December 13, 1904.

Application filed January 2, 1904. Serial No. 187,475. (No model.)

*To all whom it may concern:*

Be it known that we, CHARLES B. STRAVS and JOHN N. JAGER, of Minneapolis, in the county of Hennepin, State of Minnesota, have invented certain new and useful Improvements in Processes of Forming Pipe, of which the following is a specification.

This invention relates to improvements in processes of forming pipe; and the objects we have in view are to provide a process by which pipe in continuous lengths and of any material, but preferably of metal, may be inexpensively, rapidly, and perfectly formed.

The invention consists generally in the process of forming pipe by distributing the material from which the pipe is to be made in molten or liquid condition by centrifugal force upon the inner surface of a rotating mold and feeding said material along the inner surface of said mold in a direction parallel to its axis, whereby the material becomes gradually solidified while it is held against the surface of the mold by such centrifugal force, the solidified pipe being fed out of the mold and received upon a suitable rotating support by which it is rotated at the same rate of speed as the mold and the liquid or molten pipe material upon its inner surface or the support being stationary or rotating at a greater or less speed than the mold, so that the pipe is twisted before it becomes completely solidified.

In the accompanying drawings, forming part of this specification, we have illustrated an apparatus that may be employed in carrying out our improved process.

In the drawings, Figure 1 is a side elevation of an apparatus that may be employed in carrying out the process. Fig. 2 is a vertical section of the same. Fig. 3 is a vertical section of the lower part of the apparatus, showing a section of pipe therein. Fig. 4 is an enlarged detail section of a portion of the mold. Figs. 5, 6, 7, 8, 9, 10, 11, and 12 are outline vertical sections of a mold and plunger; and Figs. 13, 14, 15, 16, 17, 18, 19, and 20 are respectively outline plans of the molds and plungers illustrated in Figs. 5 to 12, these outline views having arrows to indicate the movements of the parts.

In carrying out our process we provide a suitable mold 2, that is preferably either cylindrical or slightly conical. It may be circular or of other form in cross-section. This mold may be supported in any suitable manner and is free to rotate upon its axis, and suitable means are provided for producing such rotation. We have here shown the mold connected to a tubular support 3, which is provided with a suitable driving-gear 4 and is supported upon the antifriction-bearings 5, carried by a sleeve 5', resting upon the stationary support or bracket 13. The upper part of the mold is provided with the distributing-chamber 6, within which is a plunger 7, having a disk or valve 8, that nearly closes the top of the mold. The pipe material is fed from the distributing-chamber 6 into the top of the mold around the edge of the disk or valve 8. The plunger 7 is provided with a tubular stem that extends upward within the tubular mold-support 3 and is connected with said mold-support so as to be compelled to rotate therewith, while being free to be raised and lowered for the purpose of adjusting the position of the disk or valve 8 in relation to the top of the mold. The upper part of the tubular stem of the plunger is supported within an adjustable sleeve 9, said stem being provided with flanges 10 and 11, extending outward above the upper and lower ends of said sleeve 9, and suitable antifriction-balls 12 being arranged between the flanges 10 and 11 and the ends of the sleeve 9. This sleeve is supported in the stationary bearing 13 by means of the ring 14, which has a screw-threaded connection with said sleeve. This ring has secured to it a gear 15, which may be rotated by a pinion 16, meshing therewith. By rotating the ring 14 the sleeve 9 is caused to move upward or downward, and thereby the stem of the plunger 7 is caused to move with it, and the disk or valve 8 on the plunger moves upward or downward within the upper part of the mold.

For the purpose of permitting the molten or liquid material to pass into the distributing-chamber 6 the tubular stem of the plunger is provided with a series of openings 17 and a disk 18 is arranged upon the head of the plunger within the chamber 6, an annular space being arranged between the edge of the disk and the inner wall of the chamber. The molten metal or other material passes through a stationary pipe or tube 19, that is secured upon a suitable support 20 and extends downward within the tubular stem of the plunger 7. The lower end of this tube is preferably substantially on a level with the top of the distributing-chamber 6, and we prefer to surround this tube with electrical heating-coils and with suitable covering of non-conducting material whereby when pipe is being formed the metal passing through the tube 19 may be maintained at a high temperature. At the top of the tube 19 we prefer to arrange a hopper 21, having a series of openings in its walls closed by mica-sheets 22, through which the material in the hopper may be seen. Above the hopper 21 is a suitable melting-pot 23, having a discharge-stem 24, a controlling-valve 25, and suitable burner 26. The pipe material when consisting of metal may be melted in this pot and discharged as desired into the hopper 21, through which it passes to the distributing-chamber 6 and the mold 2. Arranged in the lower part of the mold is a support 27. This support is arranged to hold the lower end of the pipe that is being formed and is usually arranged to move downward gradually during the formation of the pipe and also to rotate simultaneously with the mold and at the same rate of speed. It may, however, rotate at a greater speed or at a less speed, or need not rotate at all. The support 27 is shown in the drawings as carried upon a rotatable sleeve 28, having a suitable gear-wheel 29, engaged by a pinion 30. We have not thought it necessary to show in this application the means for raising and lowering the support. Any suitable means may be provided for this purpose.

We have shown in Fig. 4 of the drawings the mold that we prefer to employ. The lower part of this mold is preferably cylindrical, while the upper part is frusto-conical, and the edge of the disk 8 upon the plunger 7 is of substantially the same form as the upper part of the mold. Suitable provision is made for maintaining a high temperature in the distributing-chamber 6 and in the upper part of the mold. This may be done by means of electrical heating-coils 31, surrounding the mold, and a covering of asbestos or other non-conducting material 32, arranged outside of said heating-coils. Provision is also made for cooling the lower part of the mold. This may be done by means of a cooling-chamber 33, through which water may be passed, whereby the temperature of this part of the mold is reduced and the pipe material passing along the inner surface of the mold is cooled and solidified.

In Fig. 3 of the drawings we have shown the distributing-chamber 6 filled with molten metal A. By the revolution of the mold the heavier purer metal is moved by centrifugal force near to the wall of the mold and passes downward along said wall outside of the edge of the disk 18, while the lighter metal or dross is held within the distributing-chamber above the disk 18. The disk or valve 8 is set so as to regulate the amount of metal passing between its edge and the mouth of the mold, and hence its position regulates the thickness of the pipe that is formed. The diameter of the mold slightly increases below the disk 8, and hence the molten metal moves downward, being held by centrifugal force against the wall of the mold. The metal remains in a nearly-molten condition until it passes below the part of the mold that is surrounded by the heating-coils. Then it gradually solidifies as it passes the portion of the wall that is cooled by the surrounding water-chamber. The lower end of the newly-formed pipe reaches the support 27 and rests thereon. This support is usually rotated at the same speed as the mold, and it descends just fast enough to permit the proper movement of the pipe from the lower end of the mold. We prefer to provide a disk 35, that is supported by the plunger 7 and rotates therewith. This disk is located near the lower end of the heated part of the mold. Its edge is brought quite close to the wall of the mold, and it serves to smooth and polish the inner wall of the pipe.

We prefer to provide suitable overflow-openings 36 above the distributing-chamber 6, through which any surplus metal may escape into the chamber 37. (See Fig. 4.)

Inclined openings 38 are also preferably formed through the wall of the mold below the water-chamber 33, by means of which water may be brought directly in contact with the outer wall of the pipe in the lower part of the mold. This water passes then downward along the outer surface of the pipe and enters the chamber 39. Water may be supplied to the chamber 33 through the pipe 40.

There are several distinct advantages arising from the process of distributing the pipe material in a distributing-chamber and then feeding the said material from said chamber to the inner surface of the concentric rotating mold. One of these advantages consists in being able to regulate the feed of the material to the mold, or, in other words, to feed the material to the mold in regulated quantities while it is held in a properly-distributed condition by centrifugal force. Another advantage consists in being able to form pipe of smaller diameter than could readily be done by attempting to distribute the pipe material upon the surface of the mold itself. By employing a separate distributing-chamber, which may be made of larger diameter than the mold, as shown in the drawings, the material can be readily distributed upon the surface of this chamber and be held thereon by centrifugal force, and while so distributed and held it may be fed to the surface of the mold. This feeding to the mold may be governed or regulated as desired, and the slag or lighter material may during such feeding be retained in the distributing-chamber.

In the outline drawings, Figs. 5 to 20, we have illustrated certain modifications of the process, all of which are within our invention. For instance, in Figs. 5 and 13 of the drawings we have indicated that the mold and the plunger may rotate in either direction, and we have also indicated by the double-headed arrow upon Fig. 5 that the plunger may be raised and lowered while the mold is rotated, but is not moved vertically, thereby forming the pipe within the mold and of the length thereof and without feeding it therefrom.

Figure 6:
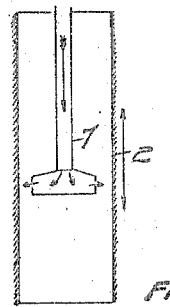
Figure 7:
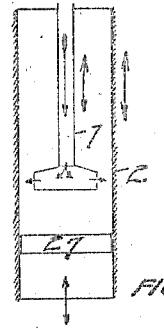
Figure 13:
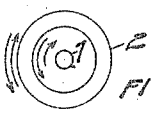
Figure 14:
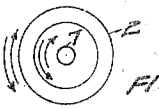
Figure 15:
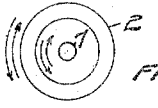
Figure 8:
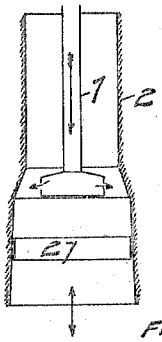
Figure 9:
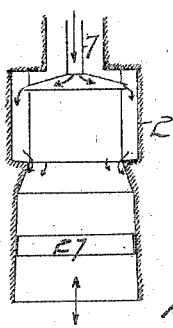
Figure 10:
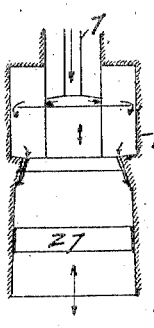
Figure 16:
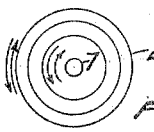
Figure 17:
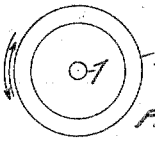
Figure 18:
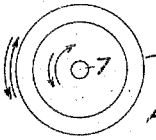

In Fig. 6 we have indicated that the mold 2 may be raised or lowered while the plunger remains stationary. In Fig. 7 we have indicated that either the mold or the support 27 or the plunger may be raised or lowered.

In Figs. 8, 9, 10, 11, and 12 we have indicated that the support 27 may be raised or lowered while the mold and the plunger remain stationary.

Figure 11:
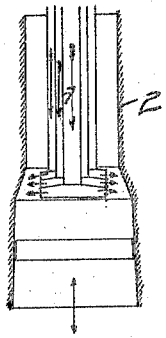
Figure 19:
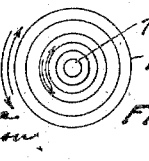

In Figs. 11 and 19 we have illustrated a modification of our process which may be employed when it is desired to form a combined pipe or one consisting of two or more different materials. As we have here indicated, we may employ a series of plungers, one arranged within the other and each acting as a distributer for a particular kind of material. Each plunger may distribute a different kind of metal, and the pipe will then be formed with one metal inside of another, all of said metals being solidified and united as they become cooled.

Figure 12:
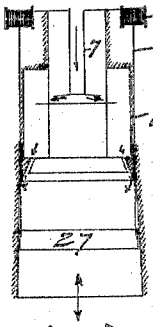
Figure 20:
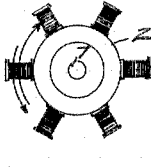

In Figs. 12 and 20 we have illustrated another modification of our process, which may be employed when it is desired to form a metal pipe with a series of longitudinal wires embedded therein. We have here shown the wires 41 supported upon suitable spools 42 and led through suitable openings to the interior of the mold, where they are in position to become embedded in the pipe as it is formed upon the interior surface of the mold, the ends of the wires being connected to the support 27.

We have not described in detail all the features of the mechanism shown and we make no claim in this application to the apparatus shown and described, the same constituting the subject-matter of a separate application for patent, Serial No. 189,767, filed January 19, 1904.

We claim as our invention —

1. The process of forming pipe consisting in distributing the pipe material in molten or liquid condition by centrifugal force upon the inner surface of a rotating distributing-chamber and feeding it in regulated quantities from the surface of said chamber onto the surface of a concentric rotating mold.

2. The process of forming pipe consisting in distributing the pipe material in molten or liquid condition upon the inner surface of a circular upright rotating distributing-chamber, and then feeding said material in regulated quantities from said surface onto the inner surface of a concentric rotating mold.

3. The process of forming pipe consisting in distributing the pipe material in molten or liquid condition upon the inner surface of a circular upright distributing-chamber, and then distributing said material in regulated quantities from said distributing-chamber onto the inner surface of a concentric rotating mold.

4. The process of forming pipe consisting in distributing the pipe material in molten or liquid condition upon the inner surface of a circular upright rotating distributing-chamber, feeding said material in regulated quantities downward from said surface onto the inner surface of a concentric rotating mold, and gradually feeding said material, while held in position upon the surface of the mold by centrifugal force, downward through said mold.

5. The process of forming pipe consisting in distributing the pipe material in molten or liquid condition upon the inner surface of a rotating distributing-chamber, feeding the material in regulated quantities from said surface onto the inner surface of a concentric rotating mold, and gradually feeding said material along the surface of the mold while held in position thereon by centrifugal force, and permitting it to become solidified, and rotating the solidified pipe at the same rate of speed as the mold and the molten or liquid material.

6. The process of forming pipe composed of two or more materials arranged one inside the other, which consists in distributing one material in molten or liquid condition by centrifugal force upon the surface of a rotating mold and while said material is held upon said surface by such force, distributing another material by centrifugal force upon said first-named material gradually feeding said materials along the surface of the mold while held in position thereon by centrifugal force and permitting said materials to become united and solidified.

In testimony whereof we have hereunto set our hands this 29th day of December, 1903.

CHARLES B. STRAUS.
JOHN N. JAGER.

In presence of—
A. C. PAUL,
C. G. HANSON.